July 7, 1953  C. S. CARLSON ET AL  2,644,786
PRECIPITATION OF NONVOLATILE SUBSTANCES IN DISTILLATION
OF FISCHER-TROPSCH SYNTHESIS MIXTURES
Filed Dec. 1, 1951
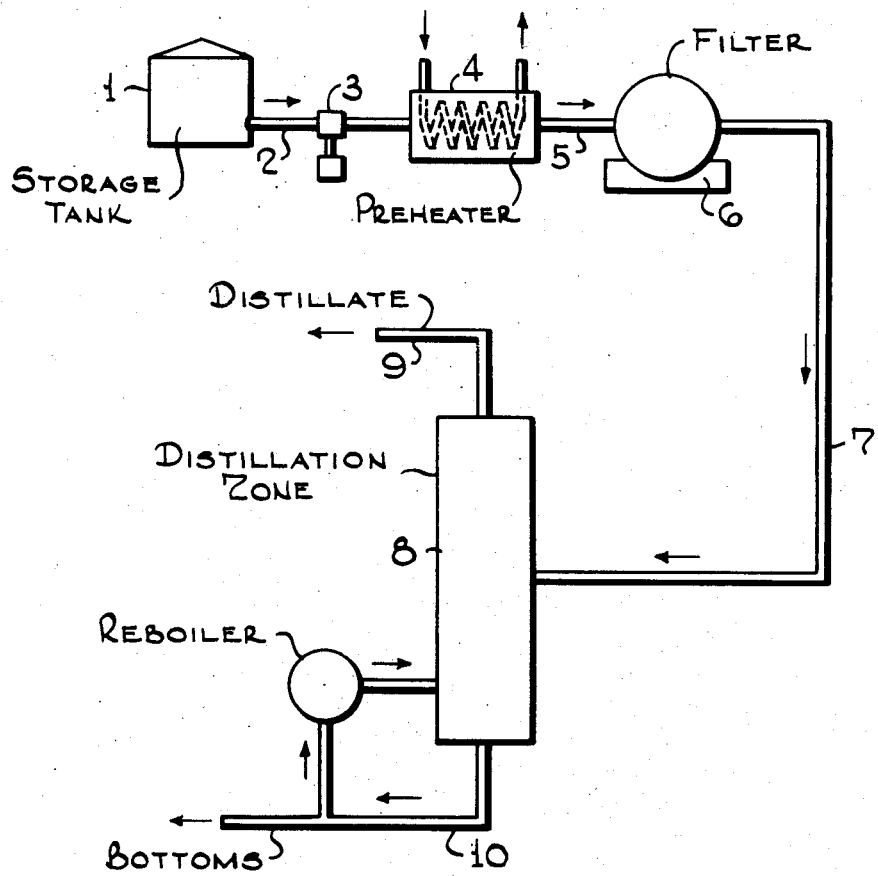
Carl S. Carlson
Frank A. Biribauer   Inventors
Carter E. Porter
By Henry Berk  Attorney Patented July 7, 1953

2,644,786

UNITED STATES PATENT OFFICE 2,644,786

PRECIPITATION OF NONVOLATILE SUBSTANCES IN DISTILLATION OF FISCHER-TROPSCH SYNTHESIS MIXTURES

Carl S. Carlson, Roselle, and Frank A. Biribauer and Carter E. Porter, Cranford, N. J., assignors to Standard Oil Development Company, a corporation of Delaware Application December 1, 1951, Serial No. 259,488

4 Claims. (Cl. 202—61)

This invention relates to an improved distillation process. More particularly, it relates to an efficient, commercially feasible process for preventing the formation of undesirable solid residues in distillation apparatus where water layer products from Fischer-Tropsch or hydrocarbon synthesis reactions are distilled.

This application is a continuation-in-part of application U. S. Serial No. 25,994, filed May 8, 1948.

Hydrocarbon synthesis reactions are performed by contacting hydrogen and oxides of carbon with catalysts under various temperature and pressure conditions. The temperatures employed vary widely, as for example, in the range from about 350° F. to about 800° F. and are generally in the range from 500° to about 700° F. The particular temperature employed depends upon, among other factors, the type of non-gaseous hydrocarbon product desired, the character and the activity of the particular catalyst utilized, the throughput and composition of the synthesis gases and upon the reaction pressure. The pressures, likewise, vary considerably and are a function of other operative conditions such as catalyst employed, activity of the catalyst, character of the feed gases and the temperatures utilized. The catalysts employed are usually selected from the iron group metals, as for example, iron, cobalt and nickel. They are utilized either alone or on suitable carriers such as kieselguhr, diatomaceous earth, pumice, synthetic gels, silica and alumina. Operations such as described are generally conducted under conditions to secure the maximum yield of hydrocarbon constituents containing 4 or more carbon atoms in the molecule. However, under the conditions of the operation, various side reactions occur which result in the production of valuable oxygenated compounds.

The proportion of the type products obtained thus vary with the conditions. In all cases, however, gaseous products removed overhead from the reaction zone are condensed and segregated into an oil phase and an aqueous phase.

Various valuable oxygenated products are thus found dissolved in the water layer such as alcohols, aldehydes, ketones, ethers, acetals, ketals, esters, and fatty acids, particularly acetic acid. These aqueous products are conveniently recovered from the water layer by atmospheric distillation. Typical distillation temperatures are 212° F. at the bottom of the distillation tower and 190° F. at the top. Because of the presence of large quantities of water in this aqueous product, e. g., 90%, little if any distillation occurs when the pot temperature dips below 205° F. This is true even for the lowest boiling component, acetaldehyde. Considerable difficulty has heretofore been encountered in the distillation of these products from the water layer because of the plugging of the plates of the distillation tower. This plugging occurs after two or three days of operation and necessitates undesirable tower shutdowns. Filtering the liquid from the water layer without a suitable preheating treatment prior to the distillation is ineffectual in remedying this difficulty.

It has now been found that the beforementioned plugging of the distillation tower can be prevented by a process comprising preheating the aqueous layer from the hydrocarbon synthesis reaction prior to its distillation. The method involves heating the aqueous layer at a temperature below that employed in the subsequent distillation operation, i. e., below about 205° F., to precipitate non-volatile residues. The latter are then separated from the heat treated product and the residual aqueous layer distilled at higher temperatures.

From the studies that have been made it has been determined that the preheating of the aqueous product in a heating zone should be conducted at a temperature below 205° F., preferably in the range of 140° F. to 180° F., for a time period within the range of about one-half to 4 hours so that a minor proportion of the non-volatile residue forming components that are precipitated by this preheating step is in an amount of 5 to 25% by weight of the total non-volatile residue components dissolved in the aqueous solution.

Experimental data show that the beforementioned heat treatment actually precipitates only about 10% of the total non-volatile residue of the water layer; but it is this fraction separated by the heat treatment which conventionally subsequently precipitates and plugs the distillation tower by forming deleterious deposits. It can thus be seen that the fraction precipitated by this heat treatment is a substantial but minor proportion of the total non-volatile residue. The precipitate obtained through this heat treatment is a complex mixture and has a brown powdery appearance.

It is indeed surprising to learn that the indicated heat treatment prevents the difficulties resulting from the plugging of the distillation tower. Thus in the prior art it had often been thought necessary to use corrosive substances such as sulfuric acid to precipitate out these undesirable materials prior to distillation. No chemical treating agent is necessary in the process of this invention. The prior art had also taught that in the overcoming of similar difficulties in somewhat similar materials, e. g., pyroligneous liquors, it was necessary to preheat at a temperature substantially higher than the subsequent distillation temperature to remove the non-volatile residues which gave rise to difficulty. The fact that the treatment of the products of this invention utilizes a temperature below that of the subsequent distillation establishes that the precipitated material is relatively specific to the aqueous product which is being processed by the indicated treatment and differs from others.

The term, non-volatile residue, as used herein refers to the total solid residue remaining after the evaporation to dryness of an aqueous product from the hydrocarbon synthesis reactions without the special heat treatment of this invention.

This invention will be better understood by reference to the flow diagram shown in the drawing.

An aqueous synthesis product containing alcohols, aldehydes, ketones, fatty acids, etc., and non-volatile residues from the hydrocarbon synthesis reaction leaves storage tank 1 and is pumped into preheater 4 by pump 3 through line 2. In preheater 4 the aqueous product is heated to a temperature of about 160° F. for about 2 hours to precipitate a substantial but minor proportion of the non-volatile residues. The resulting residual mixture leaves preheater 4 through line 5 into filter 6. The precipitate is separated in filter 6 and the filtrate discharged through line 7 to distillation zone 8. In distillation zone 8 the distillation is conducted at a minimum bottoms temperature above 140°–180° F., e. g., 210° F. The lower boiling components are taken overhead through line 9 and the bottoms removed through line 10.

The following examples will more clearly illustrate this invention:

Example I

The following data were obtained by the cold filtration of the aqueous product through filter paper and subsequent evaporation to dryness to determine, quantitatively, the residue remaining after this filtration, and after various heating and filtering operations:

| Liquid | Treatment | Grams of residue/grams of liquid | Percent Non-Volatile Residue Separated by Heating Based on Total Non-Volatile Residue After Cold Filtering |
|---|---|---|---|
| Water Layer from Hydrocarbon synthesis. | Filtered Cold | 0.0097 | |
| Do | Filtered cold, refiltered after 1½ hours at 158–176° F. | 0.0083 | 14 |
| Do | Filtered cold, refiltered after ½ hour at 158–176° F. | 0.0092 | 5 |
| Do | Filtered cold, refiltered after saturating with slow stream of air at 158–176° F. for 1½ hours. | 0.00735 | 24 |

It should be noted that by passing air through the aqueous feed, the total amount of precipitate may be increased. Apparently, the precipitates exist in an oxidized form.

Example II

Studies were made to determine the effect of temperature and time of heating on the precipitation of the soluble non-volatile residue on five samples of water layer from the hydrocarbon synthesis. Each sample comprises 150 cc.

PREHEATING TEMPERATURE—160° F.

| | Duration of Preheating | | | |
|---|---|---|---|---|
| | 0 Hours | 2 Hours | 4 Hours | 6 Hours |
| Test No. | Percent precipitated based on total non-volatile residue after cold filtering | Percent precipitated based on total non-volatile residue after cold filtering | Percent precipitated based on total non-volatile residue after cold filtering | Percent precipitated based on total non-volatile residue after cold filtering |
| 1 | 0 | 9.1 | 9.1 | 12.1 |
| 2 | 0 | 9.1 | 12.1 | 12.1 |
| 3 | 0 | 9.1 | 12.1 | 12.1 |

PREHEATING TEMPERATURE—180° F.

| 4 | 0 | 7.9 | 7.9 | |
| 5 | 0 | 4.9 | 4.9 | |

No increase in precipitation was obtained by heating to a temperature higher than 160° F., and the optimum time was from two to four hours. It is thus apparent that the time of heating and the temperature may vary depending upon the composition of the aqueous product. Samples may be taken and the heating time and temperature determined which most economically precipitates most of the precipitatable material. Thus, a suitable temperature is in the range of 140–180° F. for a minimum period of about ½ hour.

Example III

An aqueous layer from the Fischer-Tropsch synthesis is preheated in a heating zone at a temperature of about 160° F. for about an hour. Analysis indicates that about 10% by weight of the total non-volatile residue components are precipitated by this treatment. The heat treated aqueous product is then filtered and the filtrate sent to a distillation zone wherein the various oxygenated products are distilled overhead at a minimum pot temperature of 205° F. No plugging occurs in the distillation tower, even after the distillation has been completed.

The heating may be done externally or through the use of heat exchangers. It may be carried on at varying pressures and in closed or open vessels depending on the desirability of minimizing losses of evolved vapors. If desired ion exchange treatment may also be incorporated through the use of substances such as for example zeolites and ion exchange resins.

It is apparent that this invention is adapted for use with a wide range of heating, filtration, settling and decanting means and with procedures other than those specifically described. The term "separating" as used herein connotes the various methods explained. Such modifications are part of this invention and are intended to be included therein.

What is claimed is:

1. A process for the distillation of an aqueous product containing non-volatile residues from a hydrocarbon synthesis reaction wherein hydrogen and carbon monoxide are reacted, which comprises the steps of first heating the aqueous product in a heating zone at a temperature in the range of from 140° to 205° F. for a time interval of about from ½ to 4 hours to precipitate a substantial but minor proportion of said non-volatile residues; separating the thus heat treated aqueous product from the precipitate; and distilling the separated aqueous product in a distillation zone at a minimum bottoms temperature higher than that employed in the first heating step.

2. A process as in claim 1 in which the first heating temperature is in the range of from 140°–180° F.

3. A process as in claim 2 wherein the precipitate is separated from the residual aqueous product by filtration.

4. A process for the distillation of an aqueous product containing non-volatile residues from a hydrocarbon synthesis reaction wherein hydrogen and carbon monoxide are reacted, which comprises the steps of first heating the aqueous product in the absence of a chemical treating agent in a heating zone within a temperature range of from 140°–180° F., said temperature range being below the temperature employed in the subsequent distillation step, for a time interval of from ½ to 4 hours whereby a substantial but minor proportion of said non-volatile residues are precipitated; filtering the thus heat treated aqueous product; and distilling the filtrate at a temperature higher than that employed in the heating step.

CARL S. CARLSON.
FRANK A. BIRIBAUER.
CARTER E. PORTER.

References Cited in the file of this patent

UNITED STATES PATENTS

| Number | Name | Date |
|---|---|---|
| 1,089,417 | Klar | Mar. 10, 1914 |
| 1,291,800 | Dunwody | Jan. 21, 1919 |
| 2,227,979 | Othemer | Jan. 7, 1941 |
| 2,290,157 | Bright | July 21, 1942 |
| 2,417,886 | Redcay | Mar. 25, 1947 |
| 2,558,557 | Hess et al. | June 26, 1951 |

OTHER REFERENCES

Klar, "The Technology of Wood Distillation," translated by Alexander Rule, published 1925 by Chapman & Hall, Ltd., 11 Henrietta Street, London, England, pages 60–65.